May 7, 1929.  H. KOPPERS  1,712,083
APPARATUS FOR DISTILLING BITUMINOUS SUBSTANCES
Filed Sept. 29, 1922   4 Sheets-Sheet 2
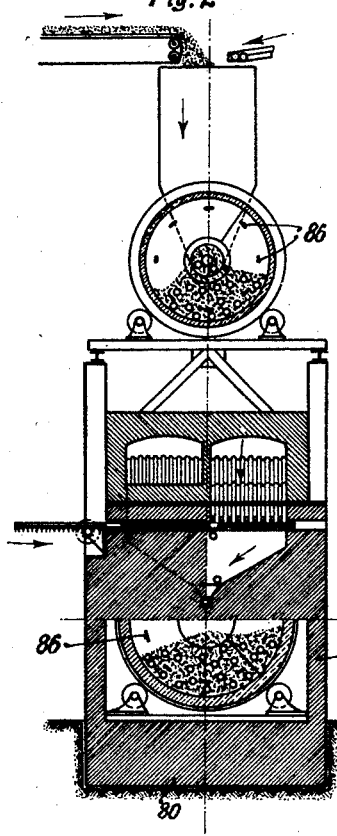
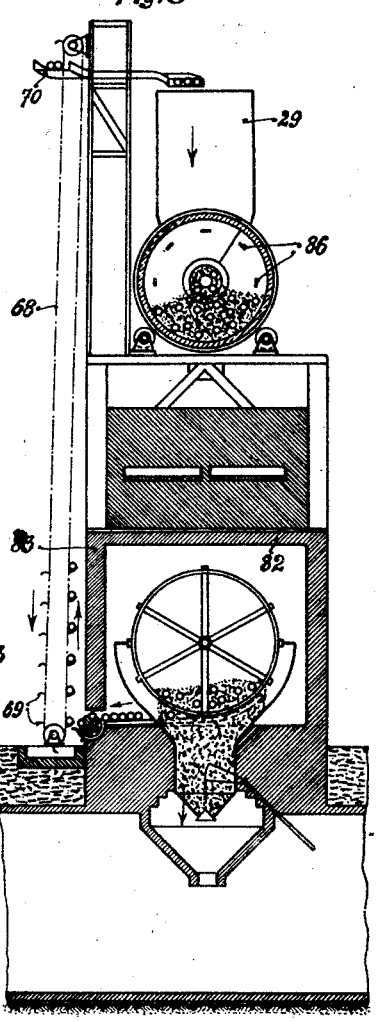
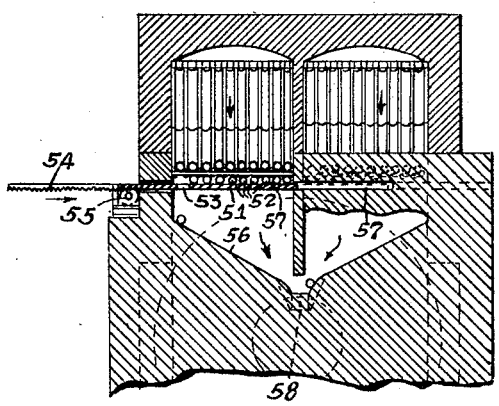

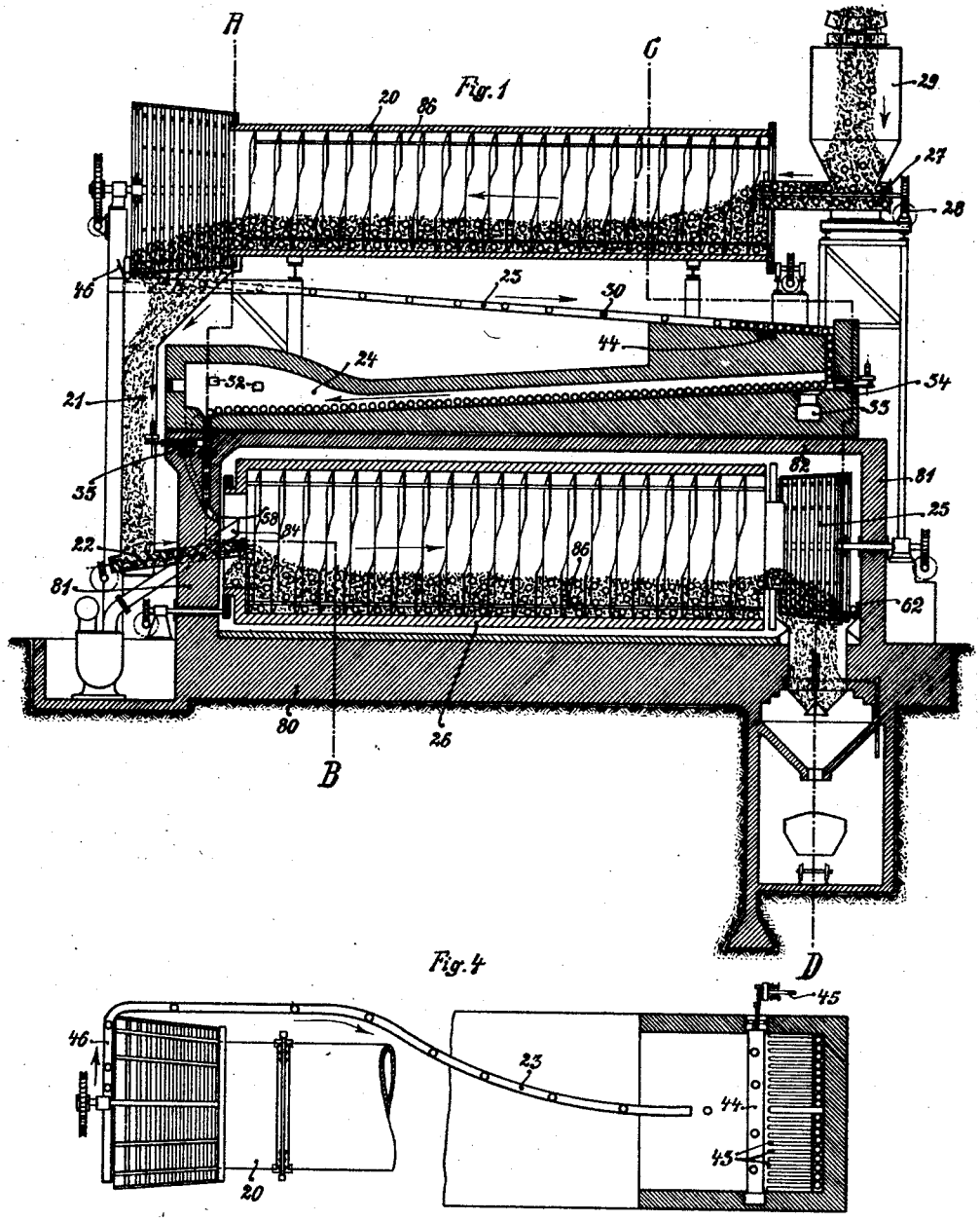

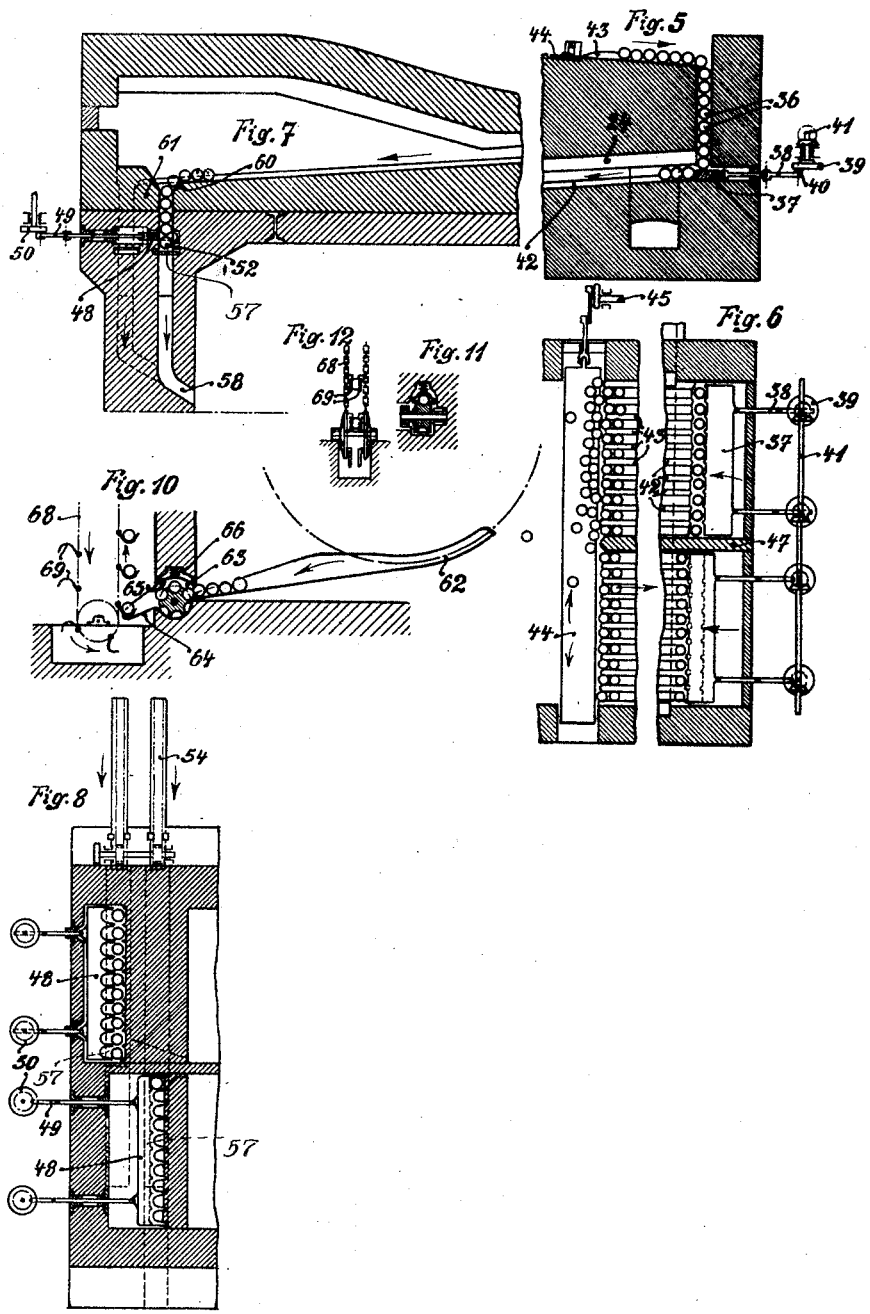

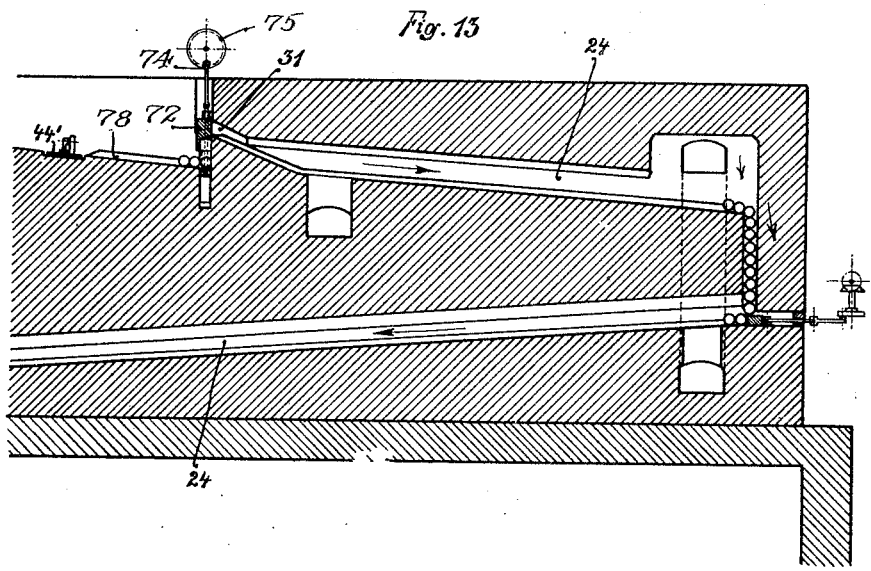
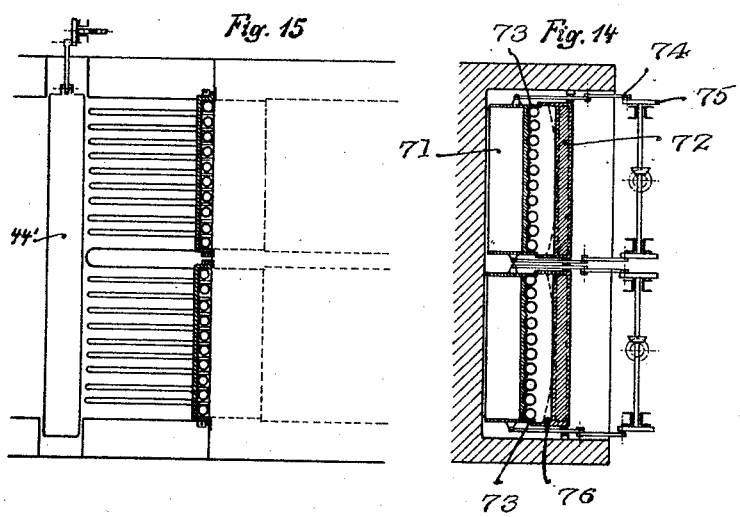

Patented May 7, 1929.

UNITED STATES PATENT OFFICE.

HEINRICH KOPPERS, OF ESSEN-RUHR, GERMANY.

APPARATUS FOR DISTILLING BITUMINOUS SUBSTANCES.

Application filed September 29, 1922, Serial No. 591,325, and in Great Britain June 28, 1922.

My invention relates to a process of, and an apparatus for, distilling bituminous substances in general and coking such substances at low temperature in particular. It is an improvement upon the process and the apparatus described and shown in pending application Number 566,012, filed June 5, 1922, in which the distillation of bituminous substances is carried through by mixing the material to be subject to the distillation with previously heated solid bodies (balls), and separating these latter from the cokelike residues. The present invention relates especially to means having the purpose of warranting a continuous service and the directing idea of which is as follows:—

In a continuous process the same quantities of balls must, of course, pass through at each place in the unit of time, corresponding to the continuity equation, as otherwise the state of inertia would be disturbed. This rule cannot be kept up in an exact manner at certain places, especially where, as in the distilling plant proper, the solid bodies are mixed with the material to be subjected to the distillation process and the mixture is to be conveyed through said plant. The same is true of the pre-drying drum and, finally, also of the heating stove for the cooled-down solid bodies.

Now, in order to re-establish the law of continuity, as far as attainable, regulating mechanisms are, according to this invention, arranged behind those working spaces, and become active after those working stages, where a disturbance of the kind mentioned might occur, the object of these mechanisms being to set in order the solid bodies arriving in the respective place or stage and to conduct them properly timed to the next place or stage. In this manner it is, in spite of the deviation from the exact fulfillment of the law in question, managed that the working spaces contain at least in average that number of solid bodies upon which the carrying-through of the respective stage is based.

The stove for re-heating the cooled-down solid bodies plays a particular rôle in the just mentioned procedure in so far as, from practical reasons, a larger quantity of the solid bodies must be treated in it. It is, thus, necessary to cover the entire base surface of the stove with such solid bodies so that these latter may be arranged in parallel paths in order to attain a certain regularity. The regulating device which is to be arranged at the inlet side of the stove is, in view of that purpose, so constructed that it distributes the solid bodies to and into said parallel paths, whereas the delivery device which is located at the delivery side of the stove, in front of the distilling space, conducts the solid bodies from said parallel paths successively to the just-mentioned space.

In order to make my invention more clear, I refer to the accompanying drawings, in which some forms of construction of the improved apparatus for carrying through the improved process are illustrated by way of example. In these drawings Figure 1 is a longitudinal section through the whole plant.

Figure 2 is a cross section on line A—B of Figure 1.

Figure 3 is a cross section on line C—D of Figure 1.

Figure 4 is a plan of the conducting channel 23, for the balls, also parts in connection therewith.

Figure 5 is a longitudinal section (to a larger scale), showing the ball regulating device 34.

Figure 6 is a plan thereof.

Figure 7 is a longitudinal section (to a larger scale), showing the ball regulating device 35.

Figure 8 is a plan thereof.

Figure 9 is a vertical section thereof, crosswise to the heating furnace.

Figure 10 is a vertical section of the ball discharging arrangement.

Figure 11 is a longitudinal section thereof.

Figure 12 is a detail of the elevator for raising the balls.

Figure 13 is a longitudinal section of a modified design of the heating furnace for the balls.

Figure 14 is a cross section to Figure 13, showing the ball regulating device appertaining thereto.

Figure 15 is a plan thereof.

Referring to Figure 1, I first state in general, to give a survey, as in the above-mentioned pending application, that the upper drum 20 serves for the preheating and the drying of the material to be subjected to distillation. The drum is fed with this material, as well as with the solid bodies, that is to say, with steel balls, through the hopper 29. These balls, however, have made already their way through the lower drum 26, and are, therefore, only still moderately warm. 24 is the stove for heating the balls. 26 is the distilling drum proper which is fed with the pre-heated and pre-dried material, as well as with the balls that have been heated in the stove 24.

It is obvious, that it is necessary that the three essential parts of the plant, namely the two drums and the heating furnace, are arranged in such relative position to each other, that the complete plant offers the most favorable results in regard to simplicity of the travelling path for the coal and the balls, as also in respect to heat economy.

In order to obtain, on the one hand for the balls and on the other hand for the coal—which generally is to be taken as representing the fuel—the best conditions for their progress through the plant, the centre lines of the pre-heating drum, of the ball heating furnace and of the distilling drum, are arranged parallel to each other and one above another in the vertical plane. Apart from the advantage gained by this compact arrangement, in respect to reduced heat radiation losses it is possible to effect the travel of the coal, delivered by suitable apparatus into the charging funnel, and of the balls, through the whole plant, practically by the forces of gravitation, whereby it is of particular importance, that the heated coal or balls do not come into contact with any sensitive parts of the manipulating apparatus.

Although the coal is more difcult to deal with than the balls, which latter can be conducted to any desired spot by simply allowing same to roll along pipes or chutes, the suggested arrangement presents particularly favorable travelling conditions for the coal, as it can fall, on leaving the upper drum 20, which it had entered through the channel funnel 29, through the vertical tube 21 downward and is then conveyed by a short spiral conveyor 22, straight into the lower drum. The treated coal passes from the lower drum, through the grid portion 25, into a hopper, to eventually leave the plant by hopper wagons or other suitable means. The way the coal is made to travel is therefore the shortest possible and is characterized by the fact, that in Figure 1 it takes the shape of a recumbent U, the open side of which in the design is on the right.

Whereas in the two drums the balls have to travel the same way as the coal, the balls on leaving the top drum and before entering the bottom drum, have to pass through a heating furnace, which also has the same length as the drums. It is therefore necessary to allow the balls to make a complete double run between the two drums to the extent of their whole length. In Figure 1 the upper half of the loop runway is formed by a channel path 23, whilst the lower half is formed by the heating furnace 24, in this way enabling the heated balls to reach the inlet end of the distilling drum by the shortest route. The travel of the balls is characterized in that in Figure 1 the balls travel from the right end of the plant through the upper revolving drum to the left end, then through the runway channel 23 to the right end, then through the heating furnace 24 again to the left end and last of all through the distilling drum 26 once more to the right end of the plant to the outlet opening.

This invention is, however, not confined to the design indicated in Figure 1 in that the heating furnace only embraces the bottom loop of the ball race, on the contrary, according to requirements, the ball race may extend over a part of the upper loop, as shown in Figure 13, where the heating furnace already starts at point 31. It is evident, that the heating of the balls will be all the greater and more intense, the more the heating furnace extends along the double loop of the ball race. The furnace is provided with inlet openings 32 for the heating gases and with outlet openings 33 for the products of combustion.

A further characteristic of this invention is the provision of several regulating devices, which serve the purpose of causing the balls to travel the route just described, in a pre-determined and periodical sequence. It is essentially necessary that the balls pass through the whole plant in a uniform stream. To ensure the proper continuity of the working of the plant, every one of the three sections of the plant, viz the pre-heating drum, the heating furnace and the distilling drum, must receive per time unit, the same number of balls, as it delivers to the next following section. For this reason, at certain points of the ball race, namely in front of the upper drum, in front and back of the heating furnace, regulating devices are introduced, which serve the object of allowing only a certain fixed and adjustable number of balls to pass per time unit. Each of these regulating devices has its own special drive, adjustable as to its number of revolutions. By means of alterations to the regulating devices and change of the revolutions of the revolving drums, the travel of the balls can be varied as desired.

The regulating device arranged in front of the upper revolving drum, consists of a short spiral conveyor 27, operated by gear 28, the speed of which determines the quantity of coal and the number of balls introduced.

The regulating device 34 (see Figures 5 and 6) for feeding the balls to the heating furnace, is arranged at the lower end of the vertical shaft or slot 36, which extends the whole width of the furnace and which for constructional considerations, is divided by a wall 47 into two compartments. The slide 37 is coupled by means of connecting rods 38 to the crank pin 40 of disc 39. Upon the shafting revolving and with it the crank disc 39, the slide 37 makes a reciprocating movement. In the position shown in Figure 5, the slide obstructs to the balls, filling the slot 36, the passage to the heating furnace. Upon the slide moving to the right, the balls in slot 36 can descend for about the thickness of one ball. Upon the reversal of the movement, the slide 37 will then push, with its front face, the bottom row of balls into the furnace 24, in which they are compelled to move along in straight lines, by means of the rail like projections 42. On account of the subdivision of the plant by the division wall 47, the slides are in duplicate. The balls filling the slots 36 and also the slides serve as dampers for the exclusion of the air.

In order to ensure the regulating devices being charged uniformly with balls, a distributing device is arranged in front of it. From Figure 4 is to be seen, that the balls on leaving drum 20, fall into a shoot 46 and are conducted from there by a channel 23, towards the right side of the plant. The duty of the distributing device is now to distribute the balls, delivered by channel 23, upon an inclined plane, uniformly along the width of the furnace. With this object in view, a flat bar 44, is embedded crosswise in the brickwork forming the furnace top and is put into a reciprocating motion by the crank gear 45. The balls in passing over this flat bar 44, (see Figure 6, left side) on being subjected to the jolting motion, are compelled to distribute themselves uniformly along the width of the furnace, entering the track, formed by the rail like projections 43, and keeping the whole of them filled with balls.

With the type of furnace, illustrated in Figure 13, in addition to those already described, another regulating device will be required, for feeding the upper part of the furnace. This object is attained in a manner, which does not open the furnace to the atmosphere, the balls being brought in rows to the inlet 31 of the furnace, within an enclosed chamber. This regulating device consists of a slide 71, which is continually raised and lowered by the crank discs 75, by means of the connecting rods 74. The slide is shown in Figure 13, in section, in the longitudinal direction of the furnace and in Figure 14 in elevation, crosswise to the furnace. In the position of the slide shown in Figure 13, the balls pass from the inclined plane 78 onto the upper face of the slide 71 which is inclined inwards. A second slide 72, arranged higher up, at that moment rests upon stops fixed to the furnace construction, the position then being such as to close the inlet opening 31 to the furnace. This second slide 72 is furnished with a recess at the lower face, which is open downwards and towards the furnace. When the slide 71 is raised by the crank arrangement, the projections 73 (see Figure 14) come into contact with slide 72, thereby raising this as well. The projections 73 are sufficiently long, as to cause the slide 72 to only rest on them, without it touching the tops of the row of balls, resting on slide 71. When the top of slide 71 has reached the level of the floor of the inlet opening 31, the row of balls, brought up by the slide, then run into the furnace. Also in this position of the slides, the interior of the furnace 24 remains closed to the atmosphere, as here the two slides form a seal to the inlet 31. On the reversal of the movement of slide 71, slide 72 travels with it for a portion of the way until it comes to rest again upon the stops.

The distributing device (flat bar 44) in connection with this design of furnace as shown in Figure 13, is arranged in front of the regulating device lastly described, the arrangement being clearly seen in the plan Figure 15.

The regulating device 35, arranged between the furnace 24 and the distilling drum 26, distinguishes itself from the regulating device 34, in that it does not periodically allow a whole row of balls to pass forward, but the balls singly in uniform but shorter intervals. This is obtained in the following manner:—

The outlet of the vertical shaft or slot 57, filled with balls, is alternately opened and closed by the operation of the slide 48 (see Figure 7). The slide 48 is, as seen in Figure 8, furnished with fork like projections, the prongs fitting between the balls, prevent the next row of balls, from passing downward. The slide 48 is operated by crank discs 50 and connecting rods 49. The balls 52, released by the slide 48, do not, however, at once pass to the distilling drum, but first come to rest upon a cross slide 51, (see Figure 9) on which they lie as in a store. This cross slide 51 is furnished with an opening 53 and on its outer end with a tooth rack, into the latter of which tooth wheel 55 is geared. Wheel 55 is made to revolve, by suitable means, alternately in either direction, causing the slide 51 to travel forwards and backwards the necessary distance. Assuming in Figure 9, the tooth rack and with it the opening 53 in slide 51 to travel to the right, the opening 53 will be passing in succession under the row of balls 52, allowing these to fall onto the inclined plane 56. On the inclined plane 56, the balls run downwards and through the inlet opening 58 into the interior of the distilling drum 26. Also with this regulating device, the subdivision of the heating furnace has been taken into account, each of its two divisions being served from within the furnace by a kind of overflow 60 and 61.

At the end of the revolving drum 26, the residue of distillation is extracted downwards, through the screen meshes 25 forming the end of the drum, the balls continuing to run forward, falling into the channel 62 (see Figure 10). The task of removing the balls from the chamber surrounding the drum 26, without allowing the gases of distillation to escape, is performed by the extractor wheel 63. This wheel is provided with recesses, into which the balls drop and on the wheel revolving, the balls are delivered to the outlet shoot 64. The wheel at the lower half has a gastight fit to the casing whilst the upper half is under pressure of a plate 65 which is forced downwards by the spring 66, ensuring that also that past the upper part of the extractor wheel 63, no gas can escape along with the balls. The ball elevating apparatus 68 is furnished with brackets 69, provided in pairs, as shown in Figure 12, carrying the balls between them, one bracket on the right and one on the left, thus allowing the brackets to pass on either side of the shoot 64, and automatically taking charge of the balls. On its upper end, the elevator (see Figure 3) delivers the balls into shoot 70, which conducts them again to the charging funnel 29. This closes the circuit of the travel of the balls.

I wish it to be understood that I do not desire to be limited to the exact details of construction and configuration shown and described, for obvious modifications will readily occur to a person skilled in the art.

I claim:—

1. An apparatus for maintaining the continuity of the process of distilling bituminous substances in successive and timed stages with aid of heated free solid bodies that are made to contact with the respective substance, comprising in combination, a distilling drum, a sieve arranged at one end of said drum and adapted to separate said free solid bodies from the residues of the distilling process; a rotary measuring member having recesses adapted to receive individually a definite number only of said free solid bodies; means for conducting the solid bodies to said rotary member from said sieve; a conveying device so arranged as to be adapted to receive the said solid bodies from the said rotary member; and means for driving the said movable parts of the apparatus.

2. An apparatus for maintaining the continuity of the process of distilling bituminous substances in successive and timed stages with aid of heated free solid bodies that are made to contact with the respective substance, comprising in combination, a distilling drum, said distilling drum having an end; a heating stove, having parallelly located guide-ways for the solid bodies, said stove having entrance channels; a shaking distributing gutter arranged in front of the entrance channels to said stove and adapted to supply said solid bodies thereto; means adapted to convey said solid bodies from said stove to said drum; a sieve arranged at one end of said drum and adapted to separate said solid bodies from the residues of the distilling process; a rotary measuring member having recesses adapted to receive individually a definite number only of said solid bodies; means for conducting the solid bodies to said rotary member from said sieve; a conveying device so arranged as to be adapted to receive the said solid bodies from the said rotary member; and means for driving the said movable parts of the apparatus.

3. An apparatus for maintaining the continuity of the process of distilling bituminous substances in successive and timed stages with aid of heated free solid bodies that are made to contact with the respective substance, comprising in combination, a distilling drum; said distilling drum having an end; a heating stove, having parallelly located guide-ways for the free solid bodies; said stove having entrance channels; a shaking distributing gutter arranged in front of the entrance channels to said stove and adapted to supply said solid bodies thereto; means adapted to convey said solid bodies from said stove to said drum; a periodically reciprocated slide at the inlets to said guide-ways; a sieve arranged at one end of said drum and adapted to separate said solid bodies from the residues of the distilling process; a rotary measuring member having recesses adapted to receive individually a definite number only of said solid bodies; means for conducting the solid bodies to said rotary member from said sieve; a conveying device so arranged as to be adapted to receive the said solid bodies from the said rotary member; and means for driving the said movable parts of the apparatus.

4. An apparatus for maintaining the continuity of the process of distilling bituminous substances in successive and timed stages with aid of heated free solid bodies that are made to contact with the respective substance, comprising in combination, a distilling drum; said distilling drum having an end; a heating stove, having parallelly located guide-ways for the free solid bodies; said stove having entrance channels and having an end; a shaking distributing gutter arranged in front of the entrance channels to said stove and adapted to supply solid bodies thereto; a periodically reciprocated slide at the inlets to said guide-ways; another reciprocated slide arranged at the end of the stove and adapted to convey the heated solid bodies from said stove singly to the distilling drum; a sieve arranged at one end of this drum and adapted to separate said solid bodies from the residues of the distilling process; a rotary measuring member having recesses adapted to receive individually a definite number only of said solid bodies; means for conducting the solid bodies to said rotary member from said sieve; a conveying device so arranged as to be adapted to receive the said solid bodies from the said rotary member; and means for driving the said movable parts of the apparatus.

5. Apparatus for heating and controlling the movement of free solid bodies comprising, in combination: a structure providing a heating chamber, said chamber having an inlet end and an outlet end and a downwardly sloping floor; means providing a plurality of parallel paths on said floor from said inlet to said outlet end of said chamber; said structure providing a vertically extending channel at the inlet end of said chamber, said channel being adapted to contain a plurality of rows of free solid bodies; means for supplying free solid bodies to said vertically extending channel; means for advancing a row of said solid bodies from said channel into said plurality of parallel paths; said structure providing a vertically extending channel at the outlet end of said chamber, said channel being adapted to receive free solid bodies from said plurality of parallel paths and being adapted to contain a plurality of rows of such bodies; a bar mounted for movement in said second mentioned channel to permit discharge from said channel of one solid body at a time from a row of said free solid bodies, said bar being adapted to support a plurality of rows of said bodies when at rest in said channel; and means for engaging and holding a row of said solid bodies above a row of said solid bodies on said bar when said bar is moved to discharge a row of said solid bodies one body at a time.

6. Apparatus for distilling bituminous substances with the aid of heated free solid bodies that are made to make contact with the substance being distilled, in combination: a drier; a distillation drum; heating means for free solid bodies therebetween communicating with said drier and said drum and means for conveying free solid bodies from the distillation drum to said drier.

7. Apparatus for distilling bituminous substances with the aid of heated free solid bodies that are made to make contact with the bituminous substances, in combination: a rotatable drier; means for supplying bituminous substances to said drier; means for supplying free solid bodies to said drier; a distillation drum; means for supplying bituminous substance from said drier to said drum; heating means for said solid bodies between and communicating with said drier and said drum; means for supplying free solid bodies from said drier to said heating means; means for supplying free solid bodies from said heating means to said drum; and means for returning free solid bodies from said drum to said drier supply means.

8. Apparatus as claimed in claim 1 and in which the rotary measuring member has recesses adapted to receive individually single members only of said solid bodies.

9. Apparatus as claimed in claim 2 and in which the rotary measuring member has recesses adapted to receive individually single members only of said solid bodies.

10. Apparatus as claimed in claim 3 and in which the rotary measuring member has recesses adapted to receive individually single members only of said solid bodies.

11. Apparatus as claimed in claim 4 and in which the rotary measuring member has recesses adapted to receive individually single members only of said solid bodies.

12. In apparatus for maintaining the continuity of a process of distilling bituminous substances in successive and timed stages with the aid of heated free solid bodies that are made to make contact with the respective substances, in combination: a drying drum; a heating stove; a distilling drum; conveying means for conveying free solid bodies from said drying drum to said stove; a controlling device for controlling movement of said solid bodies along said conveying means; a second conveying means for conveying said solid bodies from said stove to said distilling drum; a second controlling device for controlling movement of said solid bodies along said second conveying means; a third conveying means for conveying said solid bodies from said distilling drum to said drying drum; and a third controlling device for controlling movement of said solid bodies along said third conveying means; substantially as specified.

13. In apparatus for maintaining the continuity of a process of distilling bituminous substances in successive and timed stages with the aid of heated free solid bodies that are made to make contact with the respective substances, in combination: a drying drum; a heating stove; a distilling drum; conveying means for conveying free solid bodies from said drying drum to said stove; a controlling device for controlling movement of said solid bodies along said conveying means; a second conveying means for conveying said solid bodies from said stove to said distilling drum; a second controlling device for controlling movement of said solid bodies along said second conveying means; a third conveying means for conveying said solid bodies from said distilling drum to said drying drum; and a third controlling device for controlling movement of said solid bodies along said third conveying means; the three said conveying means being constructed so as to substantially allow prevention of air flow therealong into said stove and into said distilling drum, while simultaneously allowing movement of said solid bodies therealong; substantially as specified.

14. In apparatus for maintaining the continuity of a process of distilling bituminous substances in successive and timed stages with the aid of heated free solid bodies that are made to make contact with the substances to be treated, in combination: a distilling drum; a drying drum; a heating stove; said stove comprising a plurality of substantially parallel conduits; a conveying means for conveying free solid bodies from distilling drum to said drying drum; a controlling device for controlling movement of said solid bodies along said conveying means; a second conveying means for conveying said solid bodies from said drying drum to said stove; a second controlling device for controlling movement of said solid bodies along said second conveying means; a third conveying means for conveying said solid bodies from said stove to said distilling drum; a third controlling device for controlling movement of said solid bodies along said third conveying means; said second controlling device being adapted to distribute a plurality of the solid bodies simultaneously to said parallel conduits; and said third controlling device being adapted to deliver the solid bodies from said third conveying means successively and singly into the distilling drum; substantially as specified.

In testimony whereof I affix my signature.

HEINRICH KOPPERS.